July 6, 1937.　　　　A. F. POOLE　　　　2,086,391
APPARATUS FOR TIMING BALANCES
Filed Dec. 5, 1932　　　2 Sheets-Sheet 1
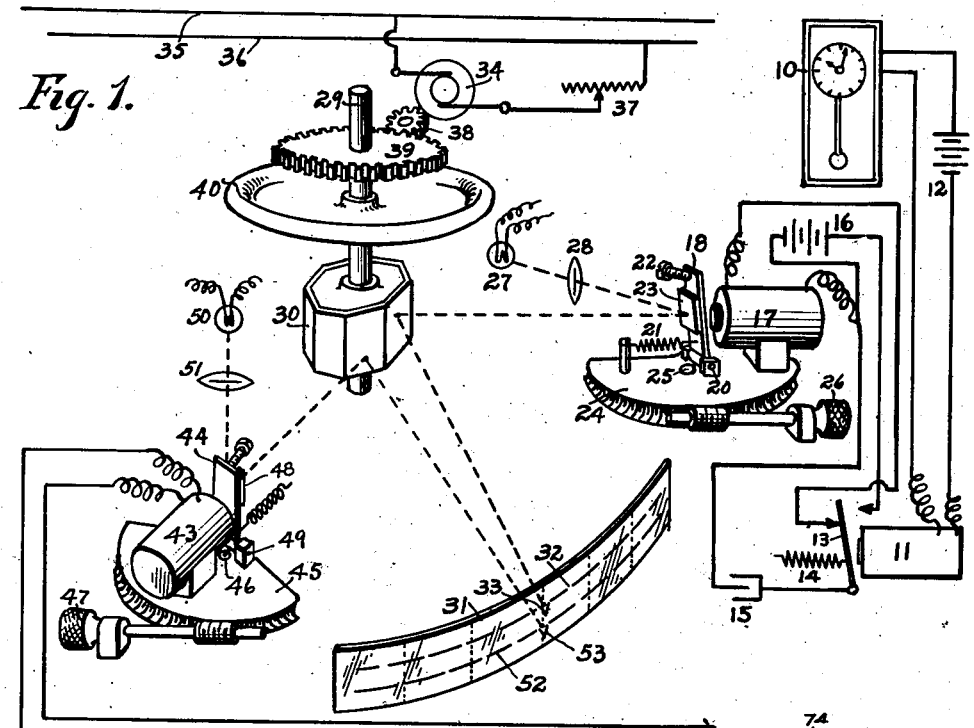
Fig. 1.
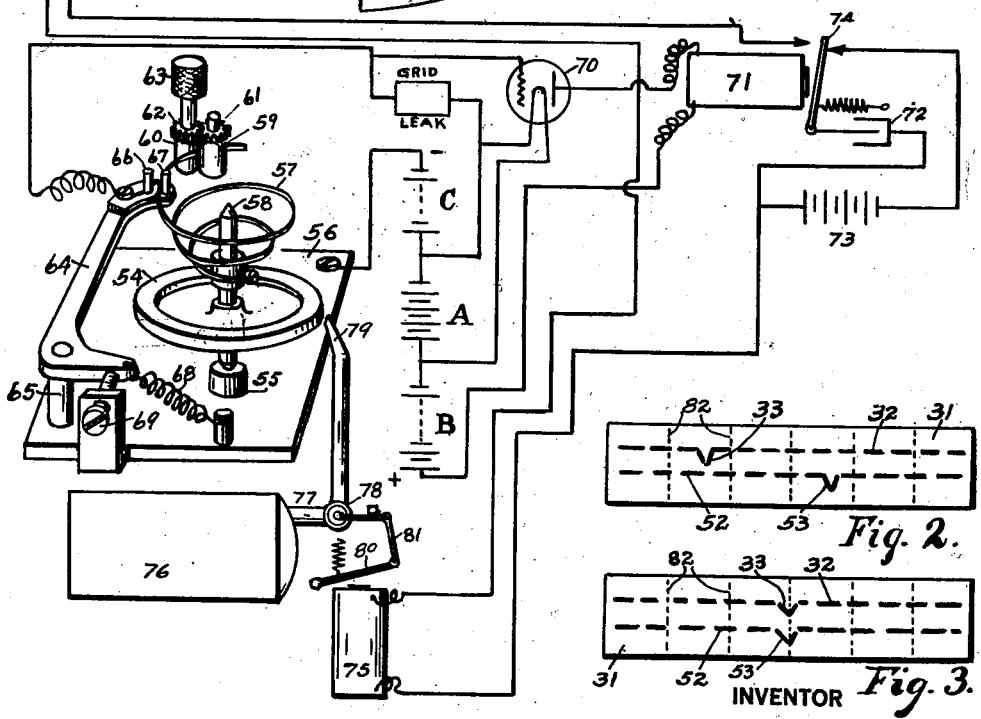
Fig. 2.
Fig. 3.
INVENTOR
Arthur F. Poole.

July 6, 1937.  A. F. POOLE  2,086,391
APPARATUS FOR TIMING BALANCES
Filed Dec. 5, 1932  2 Sheets-Sheet 2
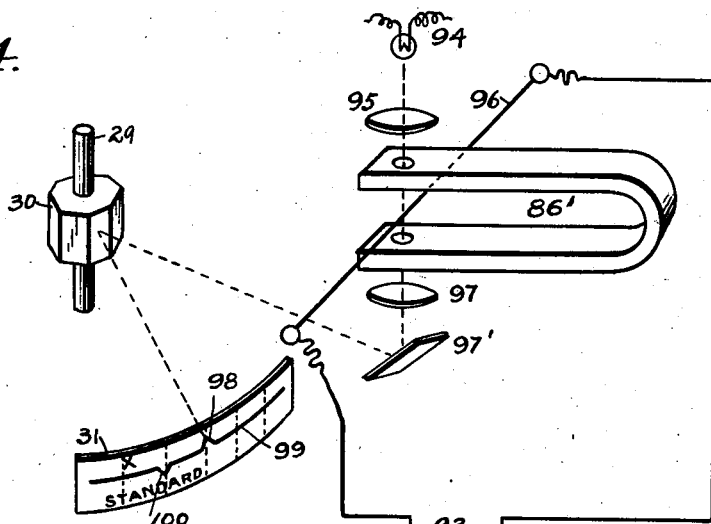
Fig. 4.
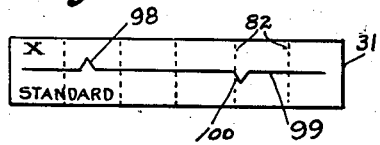
Fig. 5.
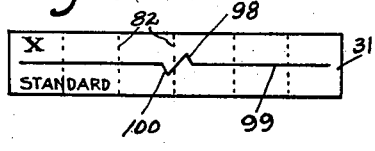
Fig. 6.
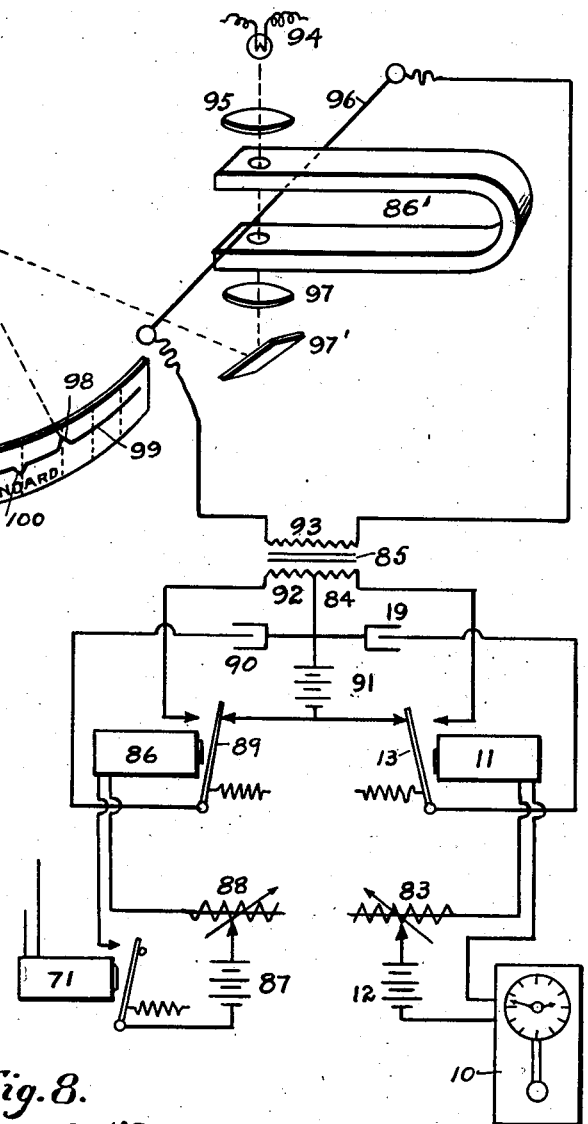
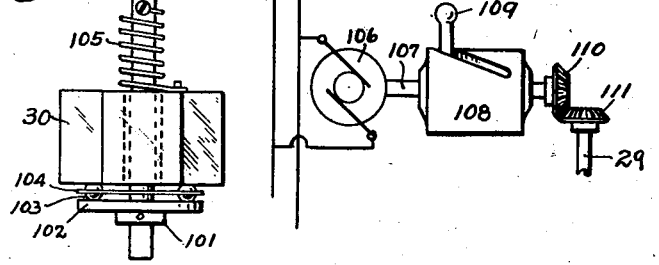
Fig. 7.  Fig. 8.
INVENTOR
Arthur F. Poole Patented July 6, 1937

2,086,391

UNITED STATES PATENT OFFICE 2,086,391

APPARATUS FOR TIMING BALANCES

Arthur F. Poole, Ithaca, N. Y.; Maryline B. Poole, administratrix of said Arthur F. Poole, deceased, assignor to Maryline B. Poole, Ithaca, N. Y.

Application December 5, 1932, Serial No. 645,729

11 Claims. (Cl. 73—51)

My invention is a new and novel apparatus for the preliminary timing of balances for watches and clocks before they are assembled in the timepieces. In practicing my herein described invention I provide a source of standard currents, preferably from a master clock or closely regulated source of alternating current and provide means to translate the vibrations of the balance to be timed, hereinafter called the "X balance", into a series of electrical impulses. Also there is a rotating or oscillating mirror and an optical system to throw a spot of light on a translucent screen. A relay in circuit with the standard impulses having a mirror tilted by its armature intercepts the beam of light and deflects it at right angles to the deflection caused by the rotating mirror with the result that a line of light is seen on the screen with a nick caused by the standard currents. Similarly, a second relay and mirror operated by currents from the X balance, hereinafter called the "X currents", and a second optical system is provided to make a second line of light on the screen. This second line also has recurrent nicks therein caused by the X currents. Both of the relays are arranged to be rotated to bring the two nicks into vertical alinement on the screen. If the X balance is not in time with the standard impulses this fact will be manifest by the nicks separating from each other. The amount the X balance differs from the standard, both in direction and amount, may easily be inferred from the direction and velocity of this separation. The X balance is then corrected, the nicks brought together and a new test is started. When the nicks stay within predetermined limits in a given time the X balance is taken as timed.

Another object of my invention is the provision of means to increase the sensitivity of the detector, while a timing is in progress, thus a preliminary adjustment is made at one sensitivity then the detector or indicator is boosted to a higher sensitivity and a more accurate timing is made.

The above and other objects of my invention will be apparent to those skilled in the art from the above description and will be set forth in the following specification and claims.

My invention will be best understood by referring to the drawings of which; Fig. 1 is a perspective layout, partly in diagram, of the apparatus to practise my invention, Figs. 2 and 3 are views of the screen and lines of light thereon, Fig. 4 is a modification of the apparatus shown in Fig. 1. In this arrangement the standard and X currents are displaced in time. Figs. 5 and 6 are views of the screen used in Fig. 4, Fig. 7 is a view of the improved governor for the rotating mirror and Fig. 8 is an arrangement using a synchronous motor and gear change box to drive the rotating mirror. Similar reference numbers identify like parts in all the figures.

In the following description I will assume that the X balances are to have a frequency of 120 beats per minute, this being the customary alarm clock beat, however it is to be understood that those skilled in the art may use, by suitable adjustments, my herein described apparatus to time balances of any frequency now in commercial use since the frequency of 120 is instanced by me herein simply to fix one's ideas.

In Fig. 1, 10 is a master clock beating 120 per minute and provided with some kind of an electrical contact to close a circuit at the same frequency. Since contacts with this function are well known in the prior art and form no part of my present invention it is not necessary further to describe one except to note that a suitable one is shown in my Patent 1,310,374 of 1919. The master clock 10 closes a local circuit containing a relay 11 and a local battery 12 with the result that the relay 11 attracts its armature 13 against a spring 14 120 times a minute. For the purpose of my invention it is desirable to transform the beats of the relay 11 into a series of short currents of the same frequency. To this end I have provided a condenser 15 which is charged from a battery 16 when the armature 13 is against its back stop, and discharged through a relay 17 when the armature 13 is drawn up to its front stop by the spring 14. These circuits will be clear from the figure without further description.

The relay 17 attracts an armature 18 turning on a shaft 20 and held by a spring 21 to a banking screw 22 to control the amplitude of motion of the armature 18. A mirror 23 is attached to the armature 18. The relay 17 and associated parts just described are mounted on a sector 24 rotating on a center 25 coaxial with the reflecting surface of the mirror 23. A tangent screw 26 serves to rotate the sector 24 and parts mounted thereon. The optical system consists of a source of light 27, which may be an automobile headlight lamp, a lens 28, an axis 29 at right angles to the relay pivot 20 and an 8 sided mirror 30 on the axis 29. A translucent screen 31 in the arc of a circle receives the ray of light from the lamp 27 as reflected by the mirrors 23 and 30. The screen 31 and the light 27 are at conjugate foci of the lens 28 and rotation of the axis 29 and attached mirror 30 will result in a line of light 32 on the screen 31 which line will be broken by recurrent nicks 33 reproducing the contacts of the master clock 10.

The axis 29 is adapted to be rotated by a motor 34 connected to power mains 35 and 36 through a regulating resistance 37 by which the speed of the motor may be regulated. Gears 38 and 39 are diagrammatically shown to run the motor at a normal speed of 120 R. P. M. A flywheel 40 is frictionally mounted on the axis 29 to provide said axis with a large moment of inertia. The 8 sided mirror rotating at 120 R. P. M. will give 16 traverses per second of the image of the lamp 27 on the screen and there will be the effect of a continuous line of light broken by a nick 33 at each standard current impulse.

Before describing the circuits by which the vibrations of the X balance are translated into a series of beats of an X relay 43, I will premise that said relay attracts its armature 44 in step with the vibrations of said balance. Analogous to the relay 17, the relay 43 is mounted on a segment 45 adapted to be turned about a center 46 by a tangent screw 47. On the armature 44 is a mirror 48 turning with said armature on a shaft 49 at right angles to the axis 29. A source of light 50 sends rays through a lens 51 to be successively reflected by the mirrors 48 and 30 to the screen 31 where it forms a line 52 broken by a nick 53 whenever the armature 44 is drawn up by the X currents.

I will now describe the circuits and apparatus by which the vibrations of the X balance are translated into currents to excite the relay 43. An X balance 54 is mounted to vibrate in a stud 55 in a fixture 56 under a hairspring 57 having its inner end attached to a balance staff 58 and the outer end clamped between two rollers 59 and 60 held together by spring tension (not shown), and geared together by gears 61 and 62 and turning in loose holes in the framework of the fixture 56. A handle 63 on one of the rollers provides means to change the length of the spring 57 in a convenient manner. The shaft 58 has also an upper bearing which is omitted in the drawings for the sake of clearness. A regulator 64 turning on a center 65 carries two regulator pins 66 and 67 between which the spring 57 plays as the balance vibrates. The pin 66 is insulated from the framework 56 and the pin 67 is grounded thereon. A spring 68 draws the regulator 64 to a screw 69 in the framework to adjust the distance of the regulator pins 66 and 67 from the balance staff 58. The rollers 59 and 60 are placed above the inner end of the hairspring 57 so as to draw the spring 57 into the form of a cone to avoid interference of the regulator 64 and rollers 59 and 60 with the inner coil of the spring. The regulator pins 66 and 67 are placed the same angular distance, referred to the staff 58, from the rollers 59 and 60 as the regulator pins of the clock are placed from the hairspring stud of the clock when the regulator is in the center. This will result in timing balances in the fixture as they will afterwards run in the timepiece without an arbitrary allowance for the effect of the regulator.

The hairspring 57 expands and contracts as the X balance vibrates, when the spring expands it makes contact with the regulator pin 66 and closes the grid circuit of a triode 70 whose C battery has its negative end connected to the framework 56 and whose grid is connected to the pin 66. In the plate circuit of the triode 70 is a B battery and a relay 71 connected as shown.

Each time the X balance moves in a direction to expand the spring 57 a negative bias will be thrown on the grid of the triode 70 which will reduce the plate current enough to de-energize the relay 71 which is energized when the grid circuit is open, or when the spring 57 is not in contact with the pin 66. Therefore the relay 71 will reproduce the vibrations of the X balance. To make these currents of short duration I have provided a condenser circuit analogous to that described in connection with the relay 17. A condenser 72 is charged from a battery 73 when the armature 74 of the relay 71 is in contact with its back stop and discharged through the relay 43 and valve magnet 75 (hereinafter to be described) when the armature 74 is in contact with its front stop. This discharge produces a short stroke of the relay 43 and magnet 75.

It is desirable to keep the X balance in vibration during the timing thereof and to this end there is a source of compressed air 76, which may be air stored in a tank or other convenient supply, to which is connected a pipe 77 having a valve 78 controlling the admission of air to a nozzle 79 which, on opening of the valve 78, directs a jet of air tangentially on the rim of the X balance each time the magnet 75 opens the valve 78 by a link 81 joined to the armature 80 of said magnet. The jet of air is directed on the X balance in the direction of the motion of said balance and thus keeps it in motion during the timing.

There is a line of light on the screen 31 broken by a nick 33 whenever the standard impulse occurs. Also there is a similar line of light 52 broken by a nick whenever an X current occurs. In general the lines and nicks will be as shown in Fig. 2, that is they will not be in vertical alinement. The screen 31 has a series of vertical lines 82 serving as graduation marks. After the X balance is put in the fixture 56 and started in vibration the nicks 33 and 53 are brought into vertical alinement in the center of the screen by the tangent screws 26 and 47. Departure of the rate of the X balance from the standard will be indicated in direction and amount by departure of the nick 53 from the nick 33. A slight variation in the speed of the mirror 30 will have no effect on this indication since such variation will displace both nicks the same amount. When the nick 53 departs from the nick 33 an appropriate correction is made in the hairspring 57 by the handle 63. The amount of such correction may readily be estimated after a little experience from the amount of such departure in a given time.

For the sake of clearness in the drawings the relays 43 and 17 are shown as displaced angularly around the axis 29. In practice they would be placed close to each other and the rays of light from both mirrors 23 and 48 would be reflected from the same face of the mirror 30, thus making a more compact arrangement than shown in the drawings.

When the nick 33 or 53 is displaced on the screen 31 by the controlling tangent screws 26 or 47 it may happen that the line of light will not extend over the entire length of the screen, the line may lap over one end. However this is not material since the only point of the line observed is the nick, so long as that is on the screen it does not matter where the rest of the line is.

At this point it may be of interest to give some figures as to the construction of a specific apparatus to time balances making 120 beats a minute or two a second. These figures are to be taken merely as illustrative of a particular structure and as not limiting the scope of my invention. The shaft 29 revolves 2 rev. per second, since the mirror 30 has 8 faces there are 16 traverses of the image of the lights 27 and 50 each second. The time of a single traverse is 0.0625 sec. There are 6 divisions 82 on the screen therefore if the nicks do not separate one division in 15 seconds then the X balance is timed to better than a minute a day.

If there is available a sufficiently accurate alternating current to serve as a standard, the motor 34 may be made a synchronous motor and the relay 17, standard clock 10 and associated parts may be omitted since the frequency of the alternating current is the standard. In this arrangement there is but one line on the screen, the divisions 82 give a measure of the departure of the X balance from the standard. It is to be noted that the sensitivity of the apparatus is a function of the speed of the axis 29, by adjusting the resistance 37 so as to revolve the axis 29 at double the speed the sensitivity, that is the departure of the nick 53 from the standard in a given time, will be doubled. A timing may be made at one speed, then without removing the X balance a higher speed may be used (keeping the higher speed an integral multiple of the lower one) and the accuracy of the adjustment is increased.

In Fig. 4 is shown a device in which the indicating nicks 33 and 53 are displaced in time instead of in space, also an Einthoven string galvanometer replaces the relays 17 and 43 as an indicating device. The master clock 10, as before, closes a local circuit 2 times a second and the local battery 12 gives current to the relay 11 at each closure of the clock contact. However in this local circuit is an adjustable inductance 83 to delay the rise of the current to a point where the relay 11 will attract the armature 13. This armature charges a condenser 19 to the potential of a battery 91 when the armature is against the back stop. When the armature 13 is drawn to the front stop the condenser 19 is discharged through a winding 84 of a transformer 85. The relay 71 which is actuated by the X currents closes a local circuit including a delay relay 86, a battery 87 and an adjustable inductance 88 so that the current in this local circuit may be delayed in reaching a level high enough to draw up an armature 89 of the relay 86. When the armature 89 is in contact with its back stop a condenser 90 is charged to the potential of the battery 91, and when against its front stop discharges the condenser 90 through a winding 92 of the transformer 85. A third winding 93 of said transformer is connected to a string galvanometer 86' whose string 96 is suitably damped. There is a source of light 94 whose rays are rendered parallel by a lens 95 which gives a field of light crossed by the shadow of the string 96. A lens 97 projects this shadow to a mirror 97' which reflects it to the revolving mirror 30 which spreads it to a line 99 on the screen 31. This string oscilloscope does not require further description, since one made by the General Radio Co., of Cambridge, Mass., has been on the market a number of years.

The windings 84 and 92 are so connected that currents in them will induce currents in contrary senses in the winding 93 and so deflect the string 96 to make downward nicks 100 from the standard impulses and upward ones 98 from the X currents (Fig. 5). The nicks 98 and 100 are brought together (Fig. 6) by the inductances 83 and 88. Their remaining in this position will be an indication of the rate of the X balance being that of the standard. The technique of adjustment is the same as in the apparatus of Fig. 1. As before variations in the speed of the axis 29 will result in displacement of both nicks.

In Fig. 7 I have shown an improved form of governor to damp out the effect of hunting by the motor 34 in the event that the supply of current in the mains 35—36 should not be uniform enough to conduct the tests. In this there is a plate 102 held rigid on the axis 29 by a collar 101. On this plate are three balls 103 held in position by a retainer 104 rotatable on 29 and having three holes in which the balls freely turn. On the balls 103 and turning on the axis 29 rests the mirror 30 which is made heavy to get the inertia effect of a flywheel. The torque of the axis 29 is transmitted to the mirror 30 by a spring 105 fastened one end to the mirror and the other to 29. The mirror system has a long period of vibration in respect to the speed of 29 so variations of speed of 29 are largely damped out. The balls 103 are used so that but a small part of the torque of the axis is transmitted to the mirror 30 by friction, the larger part being transmitted by the spring 105.

It may so happen that it may be of advantage to use an accurate source of alternating current, such as described by Lewis in the Jan. 1932 issue of the Scientific Papers of the Bureau of Standards, as a source of power for the axis 29. In this event a synchronous motor 106 as shown in Fig. 8 may be substituted for the motor 34 and resistance 37 of Fig. 1. To give the function of an adjustable speed for greater sensitivity, the motor 106 drives a shaft 107 of an adjustable gear change box 108 having a handle 109 by which the speed of the output shaft on which is a gear 110 may be varied by integral multiples of the lowest speed. The gear 110 drives a gear 111 on the axis 29. In the event that this arrangement is used, the standard nicks on the screen are superfluous. The regulated alternating current gives a standard of time by its constant frequency, the clock is in the system but it is in a different place—connected to the generator.

It is to be noted that the rotating mirror 30 is to be so arranged that when one image from a face of the 8 sided mirror reaches the edge of the screen 31, an image from the next adjacent face of 30 must start on the other edge of the screen; there must be no gaps in the line otherwise a nick might come in such a gap and a faulty indication result. I consider an oscillating mirror as used in some oscilloscopes as the equivalent of the rotating mirror described herein. The essential thing is that the optical system spread the indications of the standard and the X balance over a space so that their relative distances may be compared.

Many changes and modifications may be made in the apparatus herein shown without departing from the scope of my invention, since I claim:—

1. In an apparatus for testing balances, a source of light, a screen, a rotating mirror interposed between said light source and said screen, whereby a moving beam of light is caused to fall on said screen, a second mirror interposed between said source of light and said screen, means to transform the periodic vibrations of the balance under test into deflections of said second mirror, whereby the action of said second mirror causes offsets in the line of light produced on said screen by said rotating mirror, said offsets occurring in timed relationship to the vibrations of the balance under test.

2. In an apparatus for testing balances, a source of light, a screen, a rotating mirror interposed between said light source and said screen, whereby a moving line of light is caused to fall on said screen, a second mirror interposed between said source of light and said screen, means to transform the periodic vibrations of the balance under test into deflections of said second mirror, whereby the action of said second mirror causes offsets to occur in timed relationship to the vibration of the balance under test in the line of light produced by said rotating mirror on said screen, and means for adjusting the phase of said offsets.

3. In an apparatus for testing balances, a source of light, a screen, a rotating mirror interposed between said light source and said screen, whereby a moving line of light is caused to fall on said screen, a second mirror interposed between said source of light and said screen, means to transform the periodic vibrations of the balance under test into deflections of said second mirror, whereby the action of said second mirror causes offsets to occur in timed relationship with the vibration of the balace under test in the line of light produced by said rotating mirror on said screen, and means for adjusting the position of said second mirror, whereby the phase of said offsets may be adjusted.

4. In an apparatus for testing balances, a source of light, a screen, a rotating mirror interposed between said light source and said screen, whereby a moving line of light is caused to fall on said screen, a second mirror interposed between said source of light and said screen, means to transform the periodic vibrations of the balance under test into deflections of said second mirror, whereby the action of said second mirror causes offsets to occur in timed relationship with the vibrations of the balance under test in the line of light produced by the rotating mirror on said screen, and means for changing the phase position of said rotating mirror, whereby the phase of said offsets is thereby changed.

5. In an apparatus for testing balances, a source of standard currents, a screen, a first source of light, a second source of light, a revolving mirror interposed between said two sources of light and said screen, whereby two adjacent moving lines of light are produced on said screen, a mirror interposed between said first source of light and said screen, means actuated in time with said standard currents for deflecting said last named mirror, a second deflecting mirror interposed between said second source of light and said screen, means actuated in time with the vibration of the balance under test for deflecting said second deflecting mirror, whereby the relative position of the offsets produced in said lines of light by their respective deflecting mirrors is an indication of the difference in frequency of said standard currents and the vibrations of the balance under test.

6. In an apparatus for testing balances, a screen, a first source of light, a second source of light, a rotating mirror interposed between said sources of light and said screen whereby each source of light produces a moving line of light on said screen, a source of standard currents, means for producing a series of extremely short impulses in time with said standard currents, a mirror interposed between said first source of light and said screen, means actuated by said extremely short impulses for deflecting said last-named mirror, means for producing a series of impulses in time with the balance under test, means for producing a series of extremely short impulses in time with said balance impulses, a mirror interposed between said second source of light and said screen, means actuated by said second set of extremely short impulses for deflecting said last named mirror, whereby the relative positions of the offsets produced in said lines of light by the deflections of their respective deflecting mirrors is an indication of the difference in frequency of said standard currents and the balance under test.

7. In an apparatus for testing balances, a screen, a source of light, a rotating mirror interposed between said source of light and said screen, a synchronous motor connected to a time controlled source of alternating current for driving said rotating mirror, a second mirror interposed between said source of light and said screen, means for producing a series of extremely short electric currents in time with the vibrations of the balance under test, and means actuated by said currents for deflecting said second mirror.

8. In an apparatus for testing balances, a source of light, a screen, a rotating mirror interposed between said light and said screen, means for varying the speed of said mirror, a second mirror interposed between said source of light and said screen, means to transform the periodic vibrations of the balance under test into deflections of said second mirror, whereby the action of said second mirror causes offsets to occur in timed relationship with the vibration of the balance under test in the line of light produced by said rotating mirror on said screen, and means for adjusting the position of said second mirror whereby the phase of said offsets may be adjusted.

9. In an apparatus for testing balances, a source of light, a screen, a rotating mirror interposed between said light source and said screen, whereby a moving line of light is produced on said screen, a second mirror interposed between said source of light and said screen, means to transform the periodic vibrations of the balance under test into electric currents, means controlled by said currents for producing extremely short currents in time with said first mentioned currents, means to transform said short currents into deflections of said second mirror, whereby the action of said second mirror causes offsets to occur in timed relationship with the vibration of the balance under test in the line of light produced on said screen by said rotating mirror, and means for adjusting said second mirror, whereby the phase of said offsets may be adjusted.

10. In an apparatus for testing balances, a source of standard currents, a screen, a first source of light, a second source of light, a revolving mirror interposed between said two sources of light and said screen, whereby two adjacent moving lines of light are produced on said screen, a mirror interposed between said first source of light and said screen, means actuated in time with said standard currents for deflecting said last named mirror, means for adjusting said last named mirror whereby the phase of the light controlled by the deflection of said last named mirror may be changed, a second deflecting mirror interposed between said second source of light and said screen, means actuated in time with the vibrations of the balance under test for deflecting said second deflecting mirror, and means whereby the phase of the light controlled by said second deflecting mirror may be changed, whereby the action of the standard and the balance under test produce offsets in the respective lines of light under their respective control, whereby the relative position of said offsets is an indication of the difference in frequency between said standard currents and the frequency of the vibrations of said balance under test.

11. In an apparatus for testing balances, a screen, a first source of light, a second source of light, a rotating mirror interposed between said sources of light and said screen, whereby each source of light produces a moving line of light on said screen, a source of standard currents, means for producing a series of extremely short impulses in time with said standard currents, a mirror interposed between said first source of light and said screen, means actuated by said short impulses for deflecting said last named mirror, means for producing a series of impulses in time with the balance under test, means for producing a series of extremely short impulses in time with said balance impulses, a mirror interposed between said second source of light and said screen, means actuated by said second set of extremely short impulses for deflecting said last named interposed mirror, whereby the offsets produced in each respective line of light by the action of its respective deflection mirror will indicate by their relative position the relative frequency of said standard impulses and the vibrations of said balance, means for adjusting said first deflecting mirror whereby the phase of said offsets produced by said standard currents may be changed, and means for adjusting the position of said second deflecting mirror whereby the phase of said offsets produced in time with the vibrations of said balance may be changed.

ARTHUR F. POOLE.